United States Patent
Moulton et al.

(10) Patent No.: US 7,039,319 B1
(45) Date of Patent: May 2, 2006

(54) DWDM LASER FREQUENCY CONTROL

(75) Inventors: Grant Moulton, Santa Rosa, CA (US); Alain Houle, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 465 days.

(21) Appl. No.: 09/924,746

(22) Filed: Aug. 7, 2001

(51) Int. Cl.
*H04J 14/02* (2006.01)

(52) U.S. Cl. .................... 398/95; 398/34; 398/196

(58) Field of Classification Search .............. 398/196, 398/34, 95, 93, 197, 94; 372/32
See application file for complete search history.

(56) References Cited

U.S. PATENT DOCUMENTS

| | | | |
|---|---|---|---|
| 5,894,362 A * | 4/1999 | Onaka et al. ............ | 398/95 |
| 6,078,601 A | 6/2000 | Smith ...................... | 372/38 |
| 6,271,944 B1 | 8/2001 | Schemmann et al. ..... | 359/124 |
| 6,304,350 B1 | 10/2001 | Doerr et al. ............. | 359/130 |
| 6,441,955 B1 * | 8/2002 | Takatsu et al. .......... | 359/341.4 |
| 2002/0048063 A1 * | 4/2002 | Jung et al. .............. | 359/124 |

FOREIGN PATENT DOCUMENTS

EP 981212 A1 * 2/2000

* cited by examiner

*Primary Examiner*—Christina Y Leung
(74) *Attorney, Agent, or Firm*—Aka Chan LLP

(57) ABSTRACT

Highly efficient control of laser frequency is provided. An optical channel monitor is coupled to a composite WDM signal resulting from the multiplexing of outputs from multiple laser sources. The monitor determines the frequency of each laser and this measurement is used to provide feedback for laser frequency control. In this way a single optical channel monitor can provide frequency control for numerous WDM channels, greatly reducing the cost and space required. Monitoring capability may be provided to individual channels as needed.

15 Claims, 3 Drawing Sheets

DWDM LASER FREQUENCY CONTROL

BACKGROUND OF THE INVENTION

The present invention relates to optical communications, and more particularly to wavelength division multiplexing (WDM) transmitters.

WDM techniques are finding increasing application in optical networks. When WDM is used, multiple optical signals at different wavelengths are combined on a single fiber. This type of operation greatly increases the data carrying capacity of a single fiber and also offers other implementation advantages.

A WDM transmitter accepts multiple digital data streams and uses them to modulate optical signals at disparate wavelengths. The transmitter includes a laser to generate a sinusoidal optical signal at each wavelength included in the WDM scheme. For each laser, there is a modulator that superimposes the digital data on the sinusoidal signal. The modulator may be integral with the laser or may control electrical input to the laser. A multiplexer is then typically used to combine the various signals onto a single fiber for communication through the WDM link.

Operation of the WDM link including both the transmitter and receiver(s) depends on a shared understanding of the arrangement of the multiplexed optical signals in the frequency domain. A WDM grid defines the number of signals, i.e., channels, the spacing between channels, and their exact position in the frequency domain. The frequency of each optical signal will depend on the transmission frequency of the corresponding laser. If this transmission frequency drifts from its desired value, communication is impaired. For example, the spectrum occupied by one WDM channel may overlap and degrade another WDM channel. Also, demultiplexers and other receiver components tuned to the WDM channel's desired wavelength rather than its actual wavelength will receive the signal at reduced power or not at all. For these reasons, WDM transmitter systems typically require measurement of laser transmission frequency in combination with feedback-based control.

To precisely control the transmission frequencies, each laser is typically equipped with a wavelocker device that samples the laser output beam and divides the sampled energy into two parts. A first photodiode measures the power, P1, of the first part, while the second part of the sampled energy passes through a filter having the desired transmission wavelength as its center frequency before being measured by another photodiode that gives its power, P2. The laser frequency then can be determined based on the ratio of P1/P2. A variable electrical current is then used to adjust the laser temperature to set the laser to its desired frequency. These wavelocker devices are expensive optical systems and must be provided for each WDM channel.

The trend in optical system development is toward greater and greater numbers of WDM channels at closer spacings. Accordingly, many current and future WDM systems are often referred to as DWDM (dense wave division multiplexing) systems. A greater density of channels in current and emerging DWDM systems tightens laser frequency tolerance requirements and necessitates ever more precise control. Increasing numbers of channels in DWDM systems directly correlates to increased numbers of wavelocker devices and thus greater expense and consumption of space. What are needed are cost efficient and space efficient systems and methods for laser frequency control in WDM systems.

SUMMARY OF THE INVENTION

Highly efficient control of laser frequency is provided by virtue of one embodiment of the present invention. An optical channel monitor is coupled to a composite WDM signal resulting from the multiplexing of outputs from multiple laser sources. The monitor determines the frequency of each laser and this measurement is used to provide feedback for laser frequency control. In this way a single optical channel monitor can provide frequency control for numerous WDM channels, greatly reducing the cost and space required. Monitoring capability may be provided to individual channels as needed.

A first aspect of the present invention provides a transmitter in a WDM communication system. The transmitter includes a plurality of lasers assigned to transmit optical signals on a corresponding plurality of WDM channels, a multiplexer that combines the plurality of optical signals onto a single fiber to form a composite WDM signal, an optical channel monitor that monitors the composite WDM signal to determine wavelengths of the plurality of optical signals, and a control block that controls transmission wavelengths of the plurality of lasers to match wavelengths of the optical signals to desired WDM channel positions.

A second aspect of the present invention provides a method for transmitting in a WDM communication system. The method includes: generating a plurality of optical signals on a plurality of WDM channels using a corresponding plurality of lasers, multiplexing the plurality of optical signals onto a single fiber to form a composite WDM signal, monitoring the composite WDM signal to determine wavelengths of the plurality of lasers, and controlling transmission wavelengths of the plurality of lasers to match wavelengths of the optical signals to desired WDM channel positions.

A third aspect of the present invention provides apparatus for transmitting in a WDM communication system. The apparatus includes: means for generating a plurality of optical signals on a corresponding plurality of WDM channels, means for multiplexing the plurality of optical signals onto a single fiber to form a composite WDM signal, means for monitoring the composite WDM signal to determine wavelengths of the plurality of optical signals, and means for controlling transmission wavelengths of the plurality of optical signals to match wavelengths of the optical signals to desired WDM channel positions.

Further understanding of the nature and advantages of the inventions herein may be realized by reference to the remaining portions of the specification and the attached drawings.

DESCRIPTION OF SPECIFIC EMBODIMENTS

The present invention will be described with reference to a WDM communication system where multiple optical signals are wavelength-multiplexed on the same fiber. The number of channels, spacing between channels, and the wavelengths assigned to particular channels, are not germane to the present invention and not discussed. In the example to be described, all of the functional components are located within a WDM transmitter but the present invention is not so-limited.

Figure 1:
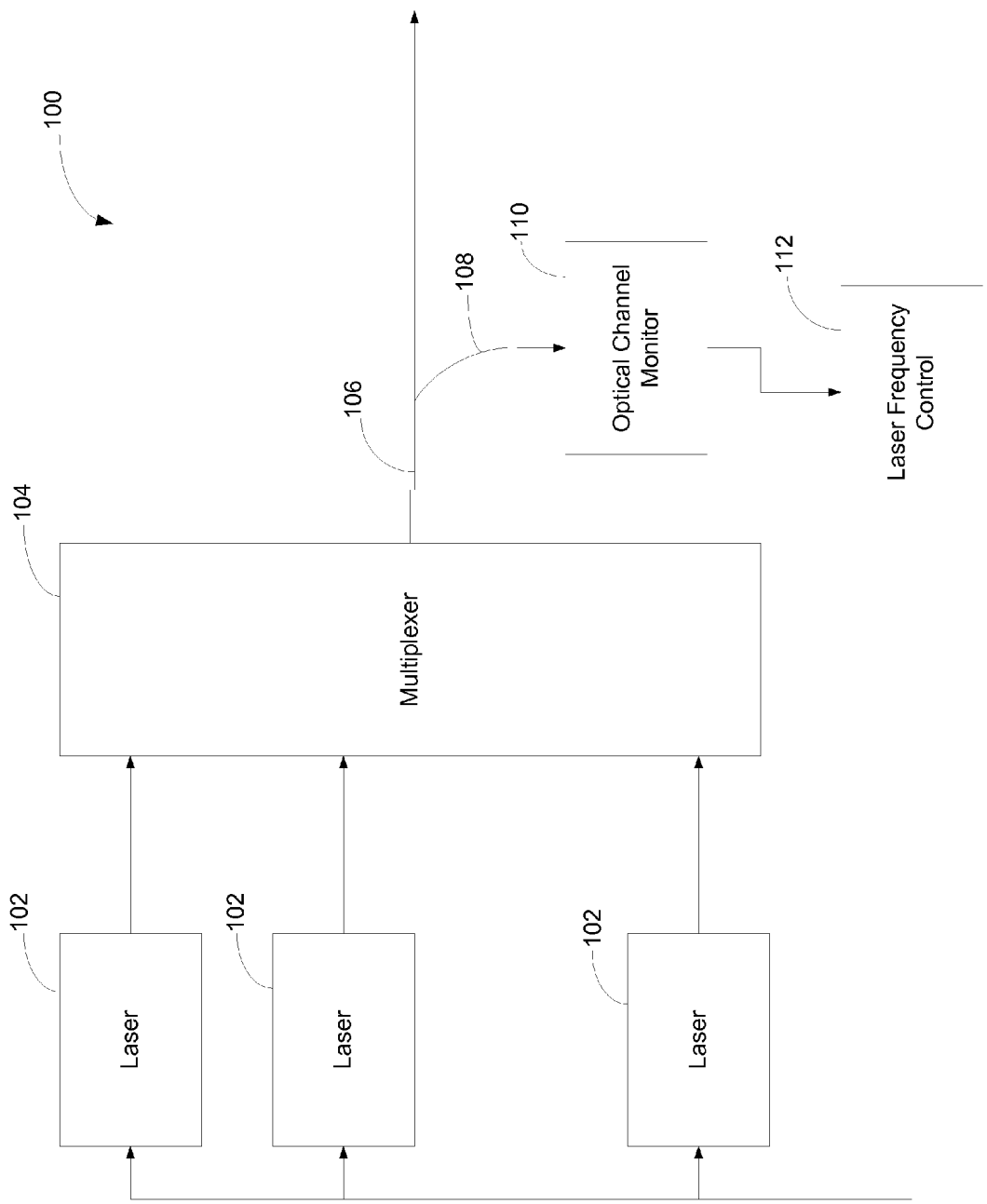
FIG. 1 depicts a WDM transmitter according to one embodiment of the present invention.

FIG. 1 depicts a WDM transmitter 100 according to one embodiment of the present invention. A plurality of lasers 102 generate optical signals on disparate wavelengths or frequencies. Each laser output is modulated with a different data stream by a modulator (not shown) that may be internal to the laser housing or external. Alternatively, the laser's drive current may be modulated. The digital data inputs are also not shown. The outputs of the lasers 102 are coupled to inputs of a multiplexer 104 that combines the optical signals having disparate wavelengths onto a common fiber 106. Fiber 106 may then be coupled into a WDM link that may include e.g., long lengths of fiber, intermediate optical amplifiers, etc. The link typically culminates in a WDM receiver that recovers the digital data modulated onto the multiple optical signals within transmitter 100.

A tap coupler 108 taps off, e.g., 1%, of the composite WDM signal traversing fiber 106 and passes this optical signal to an optical channel monitor 110. Optical channel monitor 110 analyzes the composite WDM signal sample and determines the current transmission frequency of each of lasers 102. This information is passed to a laser frequency control block 112. Laser frequency control block 112 may be implemented, e.g., as a microprocessor, a field programmable gate array (FPGA), etc., or in any suitable way. Laser frequency control block 112 adjusts the transmission frequency of each of lasers 102 to force them to their desired transmission frequencies in accordance with the currently operative WDM transmission grid. Laser frequency control block 112 is preferably preprogrammed with a map of the WDM transmission grid.

The transmission frequencies of lasers 102 are preferably varied by adjusting the operating temperature of the lasers. The laser frequency depends on the operating temperature. The laser operating temperature is sent by a temperature control loop in response to an input signal. The input signals for each of lasers 102 is provided at the output of a corresponding digital to analog converter (not shown) within laser frequency control block 112. This operating temperature is varied by controlling an input signal to each of lasers 102.

In one embodiment, the control loop bandwidth is on the order of 1 Hz. Any suitable control algorithm may be used. For example, the laser wavelength may be measured N times and averaged. Then an appropriately scaled multiple of the difference between the average measurement and the desired wavelength may be added to the signal setting the laser temperature.

Figure 2:
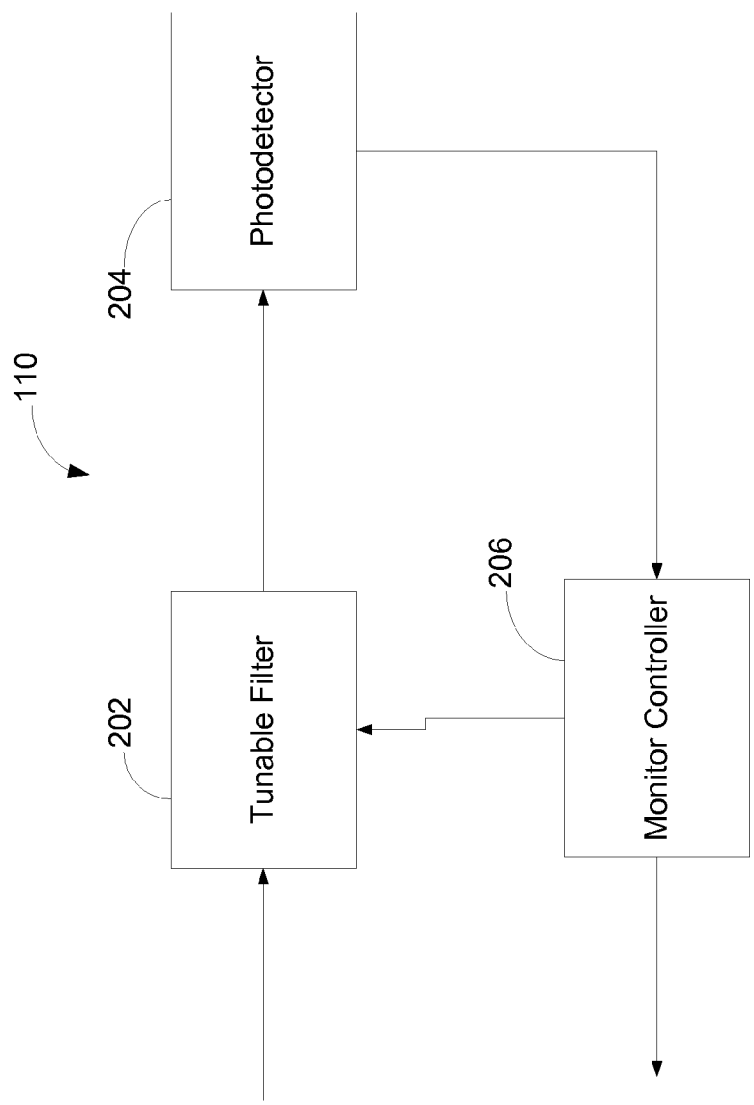
FIG. 2 depicts elements of an optical channel monitor according to one embodiment of the present invention.

FIG. 2 depicts further details of optical channel monitor 110. The WDM composite signal sample is input to a tunable optical filter 202. The output of tunable filter 202 is coupled to a photodetector 204 that generates an electrical signal indicative of the strength of the photodetector input. The strength signal is input to a monitor controller 206 that develops the frequency indications provided to laser frequency control block 112.

Monitor controller 206 steps the center frequency of tunable filter 202 across the WDM grid. The step size is preferably sufficiently small to resolve wavelength differences within the passband of tunable filter 202. As the tunable filter 202 center frequency steps across the grid, monitor controller 206 reads the power outputs from photodetector 204 to develop a sampled spectrum of the WDM composite signal. Interpolation between measurement steps is done based on knowledge of the tunable filter response 202. For example, the positions of peaks representing the WDM composite signal components may be determined using deconvolution of the measurements and the tuned filter response.

Monitor controller 206 may incorporate a microprocessor or FPGA or other suitable hardware or software to implement any necessary calculations for determining laser transmission frequencies. The microprocessor or other circuitry or software implementing monitor controller 206 may be shared with laser frequency control block 112. Tunable filter 202 may be implemented using Fabry-Perot interferometer technology. An Axsum Inc. OPM or JDS Uniphase SDLQ-M-03.9000 incorporates both tunable filter 202 and photodetector 204.

FIG. 2 depicts only one possible implementation of optical channel monitor 110. In an alternative embodiment, optical channel monitor 110 includes an arrayed waveguide grating (AWG) with multiple outputs corresponding to frequencies inside the WDM grid. Each of these outputs may be coupled to its own photodetector. Alternatively, one or more photodetectors are shared among a greater number of AWG outputs so that an individual photodiode rotates through AWG outputs over time. Again, the locations of peaks within the observed WDM composite signal spectrum are used to determine current transmission wavelengths. Alternatively, an optical spectrum analyzer may be used.

In one embodiment, power measurements across the WDM grid are made approximately every second. This control loop is capable of maintaining the output frequencies of lasers 102 within a tolerance of +/−2.5 GHz during steady state operation. Also after a cold start, lasers 102 may be brought into frequency compliance within 30 seconds. It can thus be seen that a single optical channel monitor and associated frequency control circuitry may provide frequency control for a large number of WDM channels. This saves greatly in expense and space consumption over prior art techniques that require that each laser 102 be equipped with a wavelocker.

Figure 3:
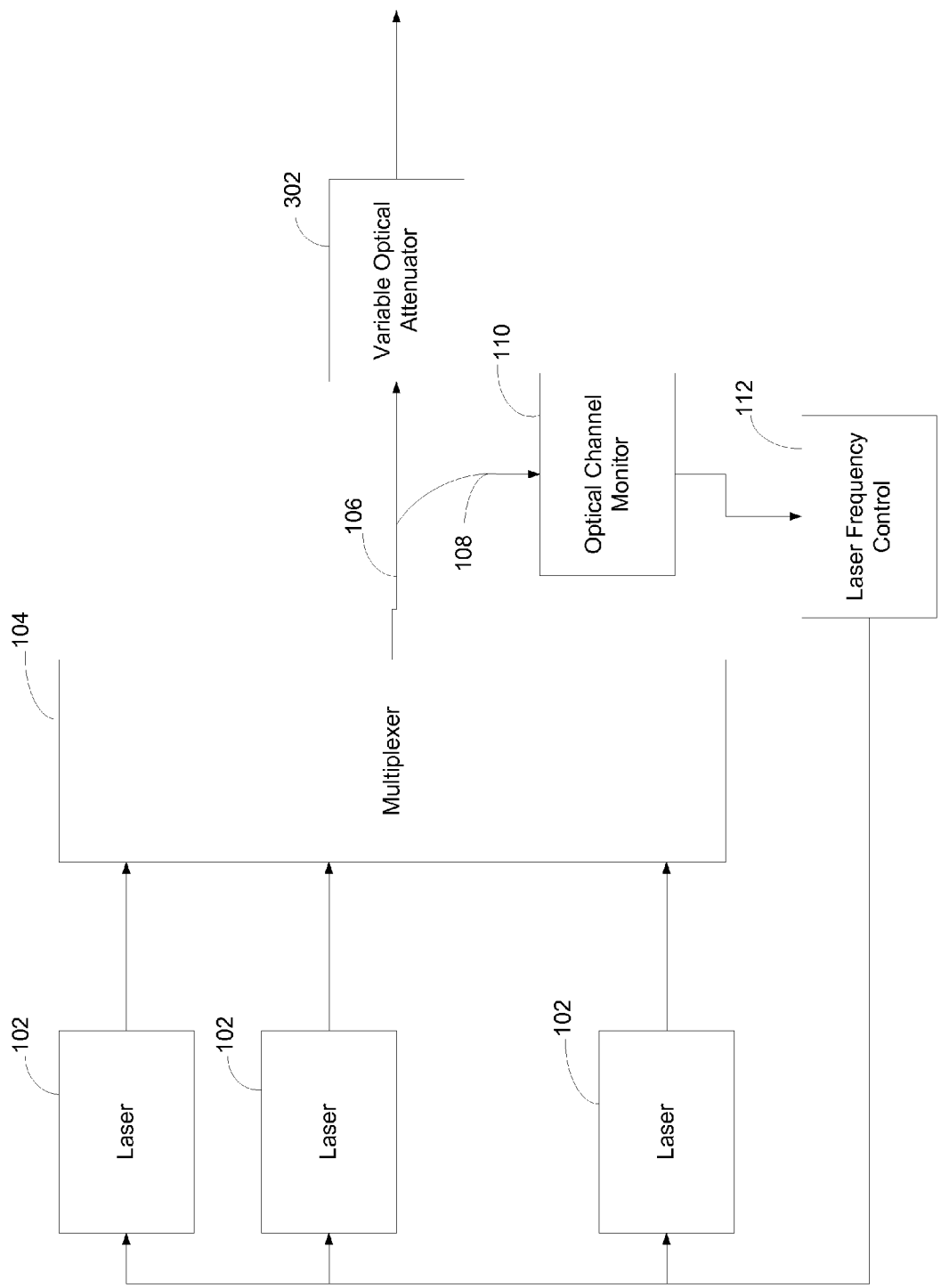
FIG. 3 depicts a WDM transmitter capable of blocking its entire output according to one embodiment of the present invention.

If one or more of lasers 102 are outside the specified frequency tolerance, it is desirable to automatically turn that laser off and/or sound an alarm. This avoids corruption of adjacent WDM channels, as well as malfunctioning of equipment on the WDM link. An alternative possibility is to block the entire composite WDM signal if even a single channel is corrupted. FIG. 3 depicts an embodiment of the present invention where a single variable optical attenuator 302 blocks the composite WDM signal from propagation down the link whenever optical channel monitor 110 determines that any of lasers 102 may be outside tolerance.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. In a WDM communication system, a transmitter comprising:
   a plurality of lasers assigned to transmit optical signals on a corresponding plurality of WDM channels;
   a multiplexer that combines said plurality of optical signals onto a single fiber to form a composite WDM signal;

an optical channel monitor that monitors said composite WDM signal to determine wavelengths of said plurality of optical signals;
a control block that controls transmission wavelengths of said plurality of lasers to match wavelengths of said optical signals to desired WDM channel positions; and
a variable optical attenuator that blocks further transmission of said composite WDM signal when said optical channel monitor determines that a wavelength of at least one of said plurality of lasers is outside a desired range.

2. The transmitter of claim 1 further comprising:
a tap coupler that splits off a portion of said composite WDM signal for monitoring by said optical channel monitor.

3. The transmitter of claim 1 wherein said optical channel monitor comprises:
a tunable filter that is tuned through a spectrum of said WDM signal;
a photodetector, coupled to an output of said tunable filter, that detects peaks of said WDM signal.

4. The transmitter of claim 1 wherein said optical channel monitor comprises:
an arrayed waveguide grating that outputs a plurality of monitor signals each indicative of composite WDM signal strength at a particular spectral position.

5. The transmitter of claim 1 wherein said optical channel monitor comprises an optical spectrum analyzer.

6. In a WDM communication system, a method for transmitting comprising:
generating a plurality of optical signals on a plurality of WDM channels using a corresponding plurality of lasers;
multiplexing said plurality of optical signals onto a single fiber to form a composite WDM signal;
monitoring said composite WDM signal to determine wavelengths of said plurality of lasers;
controlling transmission wavelengths of said plurality of lasers to match wavelengths of said optical signals to desired WDM channel positions; and
blocking further transmission of said composite WDM signal with a variable optical attenuator when monitoring determines that a wavelength of at least one of said plurality of lasers is outside a desired range.

7. The method of claim 6 further comprising:
splitting off a portion of said composite WDM signal for said monitoring.

8. The method of claim 6 wherein monitoring comprises:
tuning a tunable filter through a spectrum of said WDM signal; and
detecting peaks of said WDM signal based on output of said tunable filter; and
determining wavelengths of said lasers at positions of said peaks.

9. The method of claim 6 wherein monitoring comprises:
employing an arrayed waveguide grating to output a plurality of monitor signals each indicative of composite WDM signal strength at a particular spectral position.

10. The method of claim 6 wherein monitoring comprises:
employing an optical spectrum analyzer.

11. In a WDM communication system, apparatus for transmitting comprising:
means for generating a plurality or optical signals on a corresponding plurality of WDM channels;
means for multiplexing said plurality of optical signals onto a single fiber to form a composite WDM signal;
means for monitoring said composite WDM signal to determine wavelengths of said plurality of optical signals;
means for controlling transmission wavelengths of said plurality of optical signals to match wavelengths of said optical signals to desired WDM channel positions; and
a variable optical attenuator for blocking further transmission of said composite WDM signal when monitoring determines that a wavelength of at least one of said plurality of lasers is outside a desired range.

12. The apparatus of claim 11 further comprising:
means for splitting off a portion of said composite WDM signal for input to said monitoring means.

13. The apparatus of claim 11 wherein said monitoring means comprises:
a tunable filter that is tuned through a spectrum of said WDM signal; and
means for detecting peaks of said WDM signal based on output of said tunable filter, and
means for determining wavelengths of said lasers at positions of said peaks.

14. The apparatus of claim 11 wherein said monitoring means comprises:
an arrayed waveguide grating that outputs a plurality of monitor signals each indicative of composite WDM signal strength at a particular spectral position.

15. The apparatus of claim 11 wherein said monitoring means comprises an optical spectrum analyzer.

* * * * *